(12) United States Patent
Seki et al.

(10) Patent No.: US 6,636,431 B2
(45) Date of Patent: Oct. 21, 2003

(54) SYMMETRICAL DC/DC CONVERTER

(75) Inventors: Sumiko Seki, Tokyo (JP); Takahiko Ito, Tokyo (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 10/022,117

(22) Filed: Dec. 4, 2001

(65) Prior Publication Data

US 2002/0101745 A1 Aug. 1, 2002

(30) Foreign Application Priority Data

Dec. 4, 2000 (JP) ........................ 2000-368300

(51) Int. Cl.[7] ...................... H02M 7/00; H02M 7/5387; G05F 1/24
(52) U.S. Cl. .......................... 363/65; 363/132; 323/259
(58) Field of Search ............... 363/65, 89, 72, 363/132, 98, 17, 16; 323/222, 266, 224, 283, 259, 263

(56) References Cited

U.S. PATENT DOCUMENTS

| | | | | |
|---|---|---|---|---|
| 4,567,379 A | * | 1/1986 | Corey et al. | 307/270 |
| 5,001,621 A | * | 3/1991 | Egawa | 363/132 |
| 5,027,264 A | * | 6/1991 | DeDoncker et al. | 363/16 |
| 5,204,809 A | * | 4/1993 | Andresen | 363/132 |
| 5,436,825 A | * | 7/1995 | Wawra et al. | 363/132 |
| 5,734,258 A | | 3/1998 | Esser | |
| 5,933,331 A | | 8/1999 | Boldin et al. | |
| 6,055,169 A | * | 4/2000 | Bowman et al. | 363/65 |
| 6,191,567 B1 | * | 2/2001 | Sluijs | 323/259 |
| 6,275,016 B1 | * | 8/2001 | Ivanov | 323/224 |

FOREIGN PATENT DOCUMENTS

| | | |
|---|---|---|
| FR | 2 687 863 A1 | 8/1993 |
| JP | 2000-333445 A | 11/2000 |
| WO | WO 00/67366 A | 11/2000 |

OTHER PUBLICATIONS

Patent Abstract of Japan, vol. 2000, No. 14, Mar. 5, 2001 and JP 2000–333445 A (Toyota Corp.) Nov. 30, 2000—Abstract only.
F. Caricchi et al: "20 kW Water–Cooled Prototype of a Buck–Boost Bidirectional DC–DC Converter Topology for Electrical Vehicle Motor Drives", IEEE, pp. 887–892, XP01014767—entire document. No Date.
F. Caricchi et al: "Study of Bidirectional Buck–Boost Converter Topologies for Application in Electrical Vehicle Motor Drives", IEEE, pp. 287–293, XP101263608—Figure 2. No Date.
"On the Buses", New Electronics, Apr. 18, 2000, pp. 35–36, XP001011749—Figure 1.

\* cited by examiner

Primary Examiner—Rajnikant B. Patel
(74) Attorney, Agent, or Firm—Frishauf, Holtz, Goodman & Chick, P.C.

(57) ABSTRACT

A symmetrical DC/DC converter selects an energy transferring direction and a step-up or a step-down operation as well as a desired step-up or a step-down ratio. The converter includes a single inductor with a pair of switching devices connected to its terminals in a symmetrical arrangement with respect to the inductor. The converter is operable as a step-up converter and a step-down converter in a manner such that one and the other of the switching devices are used as an input switch and an output switch, respectively, and that one and the other of the switching devices are conversely used as an output switch and an input switch, respectively.

23 Claims, 8 Drawing Sheets

SYMMETRICAL DC/DC CONVERTER

BACKGROUND OF THE INVENTION

(1) Technical Field

This invention relates to a DC/DC converter for carrying out a step-up or a step-down operation upon transferring an electric energy and, in particular, to a symmetrical DC/DC converter.

(2) Background Art

For example, an electric double layer capacitor is known as an energy storage device having a voltage variable in dependence upon the amount of energy stored therein. When the electric double layer capacitor is used, a step-up or a step-down operation by a DC/DC converter is required when energy transfer is carried out upon charging or discharging.

In case where a motor of an electric automobile is used as a load to consume an electric energy of the electric double layer capacitor, the motor may conversely generate an electric energy, for example, upon braking to act as a power generator. If the electric energy produced by the motor is recovered, it is possible to considerably improve an energy efficiency of a whole system including the electric double layer capacitor and the motor as a power supply and a load, respectively.

Therefore, it is important that the DC/DC converter for carrying out the step-up or the step-down operation has a function of transferring the electric energy in one direction from one terminal portion to the other terminal portion and in the other direction from the other terminal portion to the one terminal portion, whichever terminal portion acts as an input terminal portion to be supplied with the electric energy. To this end, it is proposed to provide a pair of DC/DC converters for the respective directions and a switch for selecting one of the DC/DC converters. However, this structure is not practical because the size of the whole system is increased. In view of the above, it is indispensable to provide a DC/DC converter which, as a single circuit, is operable even if an input terminal portion and an output terminal portion are exchanged.

As the DC/DC converter of the type described, proposal has already been made of a so-called bidirectional converter.

A first existing bidirectional DC/DC converter is a circuit device connected between a battery or a power supply (such as an electric double layer capacitor) and a load (such as a motor) and has a plurality of switching circuits and four terminals.

The first existing bidirectional DC/DC converter is operable in the following manner. In case where the electric double layer capacitor supplies the electric energy to the motor to drive the motor, one of the switching circuits is put into an opened state while the other switching circuit is operated under PWM (Pulse Width Modulation) control or the like. In this event, the DC/DC converter is operated as a forward converter circuit. On the other hand, in case where the electric energy generated by the motor is supplied to the electric double layer capacitor to charge the electric double layer capacitor, the other switching circuit is put into an opened state while the one switching circuit is operated under the PWM control or the like. In this case, the DC/DC converter is operated as the forward converter circuit.

Japanese Unexamined Patent Publication No. 2000-333445 (JP 2000-333445 A) discloses a second existing bidirectional DC/DC converter connected between a d.c. power supply and a load including a capacitor. The second existing bidirectional DC/DC converter uses FETs (Field Effect Transistors) as switching devices. Specifically, the second existing bidirectional DC/DC converter comprises a first series circuit, a second series circuit, an inductor, and a control unit. The first series circuit comprises first and second FETs connected in parallel to the d.c. power supply. The second series circuit comprises third and fourth FETs connected in parallel to the load. The inductor is connected between a junction of the first and the second FETs and another junction of the third and the fourth FETs. The control unit controls respective gates of the first, the second, the third, and the fourth FETs so that the electric energy is supplied from the d.c. power supply to the load and that the electric energy stored in the capacitor is recovered and fed back to the d.c. power supply.

The above-mentioned first existing bidirectional capacitor comprises a plurality of inductors and has a complicated circuit structure.

In case where the energy storage device, such as the electric double layer capacitor, having a variable voltage is used or in case where the motor is driven as the load and conversely produces the electric energy to be recovered, the system includes voltage variation corresponding to the amount of energy. Therefore, it is necessary not only to transfer the energy in two directions but also to desiredly carry out the step-up or the step-down operation in correspondence to the status of energy at the electric double layer capacitor (power supply) and the motor (load).

In case where the system is constructed by a combination of a plurality of energy storage devices, a plurality of power generators, and a plurality of loads, it is necessary to set an appropriate step-up ratio or an appropriate step-down ratio of the DC/DC converter connected to these components. Thus, each of the existing bidirectional DC/DC converters is not applicable to such system.

SUMMARY OF THE INVENTION

It is therefore an object of this invention to provide a symmetrical DC/DC converter which is operable in a variable direction corresponding to an energy transfer direction at a step-up or a step-down ratio corresponding to an input/output voltage ratio.

According to this invention, there is provided a symmetrical DC/DC converter comprising a single inductor with a pair of switching means connected to its terminals in a symmetrical arrangement with respect to the inductor, the converter being operable as a step-up (boost) converter and a step-down (buck) converter in a manner such that one and the other of the switching means are used as an input switch and an output switch, respectively, and that one and the other of the switching means are conversely used as an output switch and an input switch, respectively.

DESCRIPTION OF THE PREFERRED EMBODIMENTS

For a better understanding of this invention, description will at first be made of existing DC/DC converters.

Figure 1:
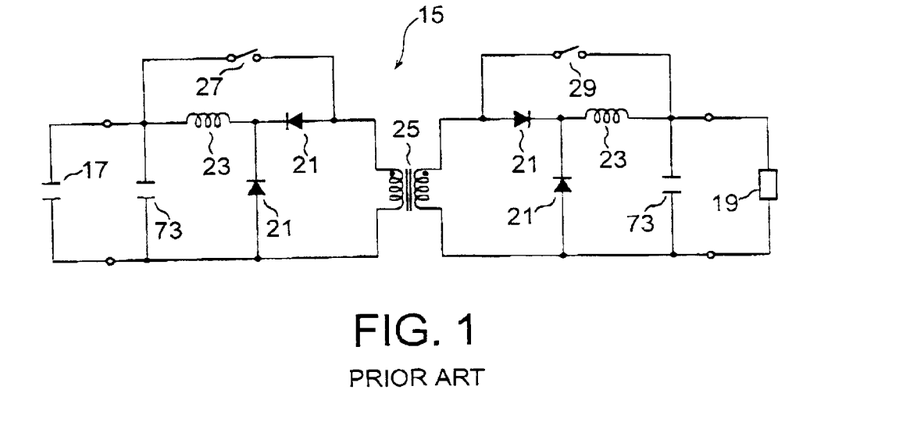
FIG. 1 is a circuit diagram showing the structure of a first existing bidirectional DC/DC converter.

Referring to FIG. 1, a first existing bidirectional DC/DC converter 15 is connected between an electric double layer capacitor 17 as a power supply and a motor 19 as a load and comprises a transformer 25 and a pair of switching circuits 27 and 29. The converter 15 also includes diodes 21 and inductors 23.

In case where an electric energy is supplied from the electric double layer capacitor 17 to the motor 19 to drive the motor 19, the switching circuit 29 is put into an opened state while the switching circuit 27 is operated under PWM control or the like. In this event, the DC/DC converter is operated as a forward converter circuit.

In case where an electric energy generated by the motor 19 is supplied to the electric double layer capacitor 17 to charge the electric double layer capacitor 17, the switching circuit 27 is put into an opened state while the switching circuit 29 is operated under the PWM control or the like. In this case, the DC/DC converter is operated as the forward converter circuit.

Figure 2:
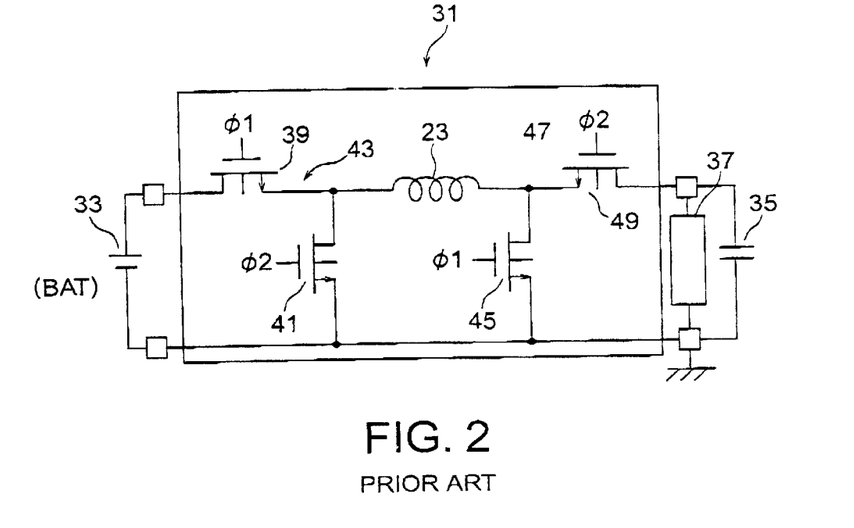
FIG. 2 is a circuit diagram showing the structure of a second existing bidirectional DC/DC converter.

Referring to FIG. 2, a second existing bidirectional DC/DC converter 31 is connected between a d.c. power supply 33 and a load 37 including a capacitor 35. The second existing bidirectional DC/DC converter 31 uses FETs as switching devices. Specifically, the second existing bidirectional DC/DC converter 31 comprises a first series circuit 43, a second series circuit 49, an inductor 23, and a control unit (not shown). The first series circuit 43 comprises first and second FETs 39 and 41 connected in parallel to the d.c. power supply 33. The second series circuit 49 comprises third and fourth FETs 45 and 47 connected in parallel to the load 37. The inductor 23 is connected between a junction of the first and the second FETs 39 and 41 and another junction of the third and the fourth FETs 45 and 47. The control unit controls respective gates of the first, the second, the third, and the fourth FETs 39, 41, 45, and 47 so that the electric energy is supplied from the d.c. power supply 33 to the load 37 and that the electric energy stored in the capacitor 35 is recovered and fed back to the d.c. power supply 33.

Now, description will be made of several preferred embodiments of this invention with reference to the drawing.

Figure 3:
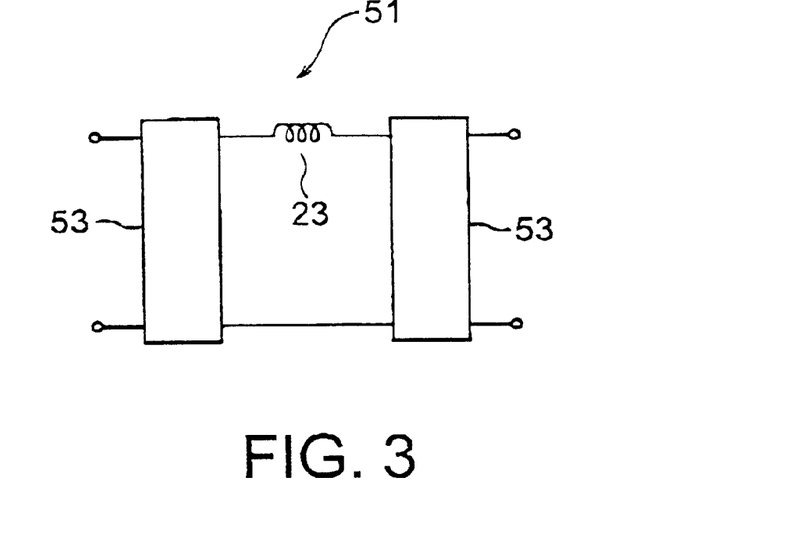
FIG. 3 is a circuit diagram of a symmetrical DC/DC converter according to a first embodiment of this invention.

Referring to FIG. 3, a symmetrical DC/DC converter 51 according to a first embodiment of this invention comprises an inductor 23 and a pair of switching portions 53, 53. By individually controlling the switching portions 53, 53, selection is made of an input/output direction (i.e., an energy transfer direction) and a step-up or a step-down operation.

Figure 4:
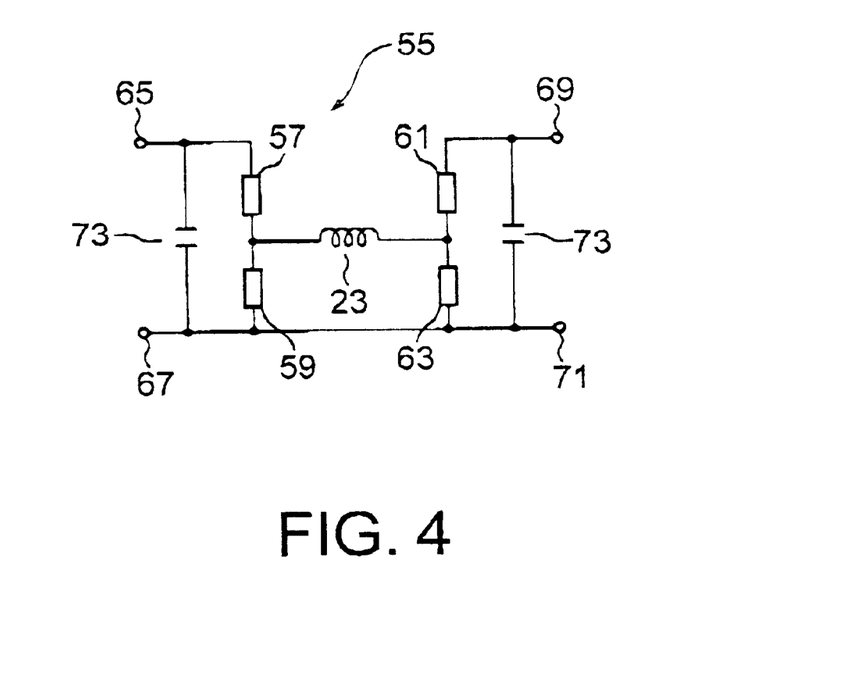
FIG. 4 is a circuit diagram of a symmetrical DC/DC converter according to a second embodiment of this invention.

Referring to FIG. 4, a symmetrical DC/DC converter 55 according to a second embodiment of this invention comprises the inductor 23, first and second switching portions 57 and 59 each having one end connected to one end of the inductor 23, third and fourth switching portions 61 and 63 each having one end connected to the other end of the inductor 23, first through fourth terminals 65, 67, 69, and 71 connected to the other ends of the first through fourth switching portions 57, 59, 61, and 63, respectively, and a pair of capacitors 73. One capacitor 73 is connected between the first and the second switching portions 57 and 59 and the other capacitor 73 is connected between the third and the fourth switching portions 61 and 63. The second and the fourth terminals 67 and 71 are connected to each other.

Table 1 shows the states of the first through the fourth switching portions 57, 59, 61, and 63 in case where the first and the second terminals 65 and 67 are used as input terminals while the third and the fourth terminals 69 and 71 are used as output terminals and in case where the first and the second terminals 65 and 67 are used as output terminals while the third and the fourth terminals 69 and 71 are used as input terminals. For each case, the step-up operation and the step-down operation are shown.

TABLE 1

| 1st, 2nd Terminals | 3rd, 4th Terminals |  | 57 | 59 | 61 | 63 |
|---|---|---|---|---|---|---|
| Input | Output | Step-up | ON | OFF | D | SW |
|  |  | Step-down | SW | D | ON | OFF |
| Output | Input | Step-up | D | SW | ON | OFF |
|  |  | Step-down | ON | OFF | SW | D |

In Table 1, "ON" and "OFF" represent a short-circuited or a closed state and an opened state, respectively. "SW" is a controlled state where ON/OFF is intermittently switched under PWM control or the like so that an appropriate step-up or a step-down ratio is obtained. "D" represents a rectifying state of performing a rectifying operation.

Figure 5:
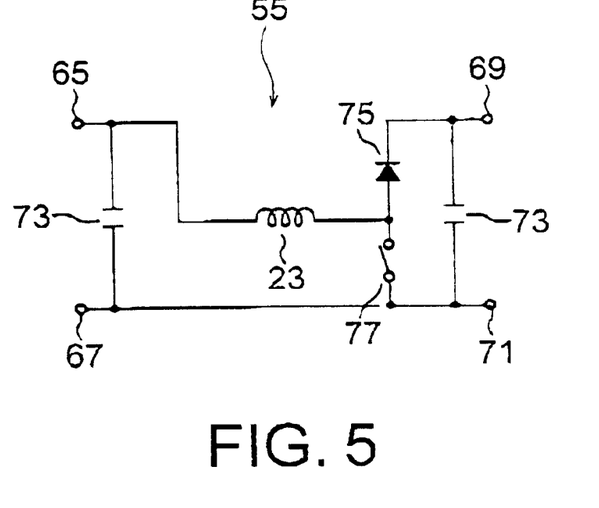
FIG. 5 shows the symmetrical DC/DC converter in FIG. 4 during a step-up operation using third and fourth terminals as input terminals.

Referring to FIG. 5, a symmetrical DC/DC converter 55 is operated as a step-up converter with the first and second terminals 65 and 67 used as input terminals and the third and fourth terminals 69 and 71 used as output terminals.

The first switching portion 57 is in the ON state, i.e., in the closed state while the second switching portion 59 is in the OFF state, i.e., in the opened state. The third switching portion 61 is in the D state, i.e., acts as a diode 75 to perform the rectifying operation. The fourth switching portion 63 is in the SW state, i.e., acts as a switching circuit 77 to controllably set an appropriate step-up ratio.

Figure 6:
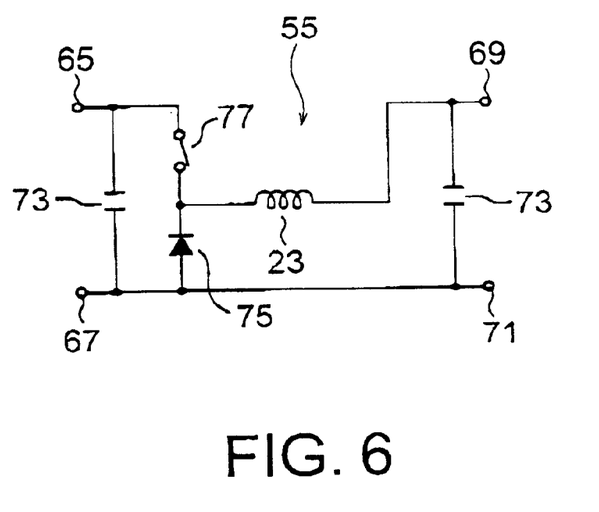
FIG. 6 shows the symmetrical DC/DC converter in FIG. 4 during a step-down operation using third and fourth terminals as input terminals.

Referring to FIG. 6, the symmetrical DC/DC converter 55 according to the second embodiment of this invention is operated as a step-down converter with the first and the second terminals 65 and 67 used as input terminals and the third and the fourth terminals 69 and 71 used as output terminals, like in case of FIG. 5.

The first switching portion 57 is in the SW state, i.e., acts as the switching circuit 77 to controllably set an appropriate step-down ratio. The second switching portion 59 is in the D state, i.e., acts as the diode 75 to perform the rectifying operation. The third switching portion 61 is in the ON state, i.e., in the closed state while the fourth switching portion 63 is in the OFF state, i.e., in the opened state.

On the contrary, in case where the first and the second terminals 65 and 67 are used as output terminals while the third and the fourth terminals 69 and 71 are used as input terminals, the similar operation is realized by changing the states of the switching portions between a pair of the first and the second switching portions 57 and 59 and another pair of the third and the fourth switching portions 61 and 63.

Figure 7:
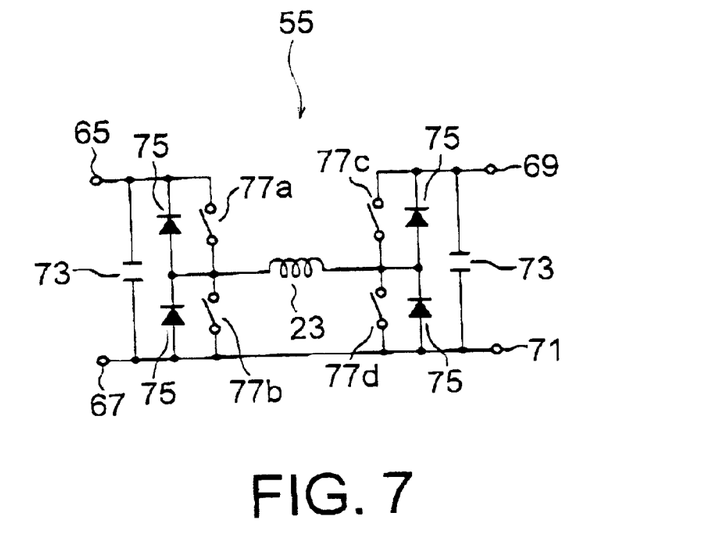
FIG. 7 is a circuit diagram of a symmetrical DC/DC converter according to a third embodiment of this invention.

Referring to FIG. 7, a symmetrical DC/DC converter according to a third embodiment of this invention is similar in structure to the second embodiment. In the third embodiment, each of the first through the fourth switching portions 57, 59, 61, and 63 comprises a switching circuit 77 (77a–77d) and a rectifier 75 connected in parallel to each other.

Table 2 shows the states of the first through the fourth switching portions 57, 59, 61, and 63 in case where the first and the second terminals 65 and 67 are used as input terminals while the third and the fourth terminals 69 and 71 are used as output terminals and in case where the first and the second terminals 65 and 67 are used as output terminals while the third and the fourth terminals 69 and 71 are used as input terminals. For each case, the step-up operation and the step-down operation are shown.

TABLE 2

| 1st, 2nd Terminals | 3rd, 4th Terminals | | 57 | 59 | 61 | 63 |
|---|---|---|---|---|---|---|
| Input | Output | Step-up | ON | D | D | SW |
| | | Step-down | SW | D | ON | D |
| Output | Input | Step-up | D | SW | ON | D |
| | | Step-down | ON | D | SW | D |

In Table 2, if the switching circuit 77 is put in the OFF state, i.e., in the opened state, the switching portion performs the rectifying operation in the D state because the diode 75 is connected in parallel to the switching circuit 77. Therefore, the OFF state or the opened state in each part of Table 1 is changed into the D state of the rectifying operation.

However, at the part where the opened state is changed into the D state of the rectifying operation, the diode in the switching portion is not applied with a forward voltage. This means that this D state is equivalent to the opened state. Therefore, the operation similar to that shown in Table 1 is achieved.

Thus, in the symmetrical DC/DC converter in FIG. 7, the operation similar to that shown in Table 1 can be realized simply by turning ON/OFF of the switching circuit 77.

Figure 8:
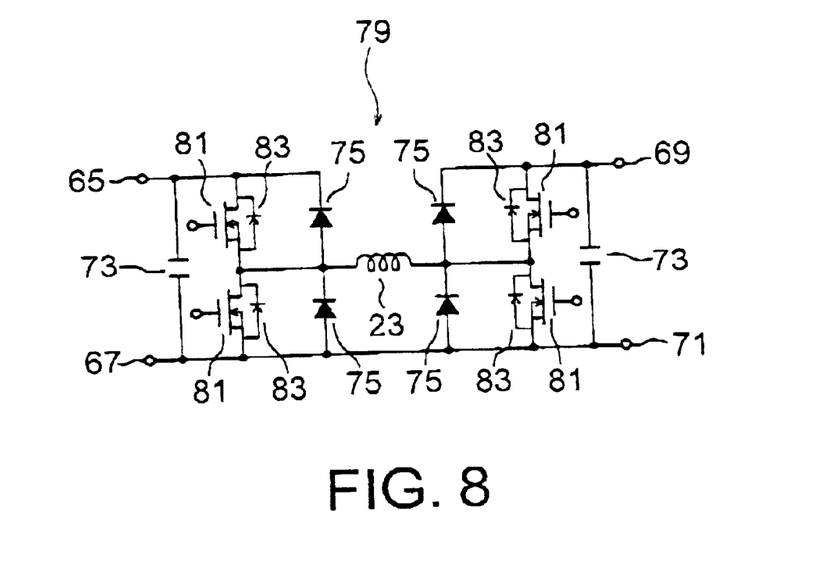
FIG. 8 is a circuit diagram of a symmetrical DC/DC converter according to a fourth embodiment of this invention.

Referring to FIG. 8, a symmetrical DC/DC converter 79 according to a fourth embodiment of this invention uses FETs 81 as the switching circuits 77 (77a–77d) illustrated in FIG. 7. Each of the FETs 81 has a body diode 83 which can be used as a rectifier.

As illustrated in FIG. 8, the diode 75 as a high-performance diode which is low in forward voltage Vf than the body diode 83 and short in recovery time is connected in parallel to the body diode 83 of each FET 81 to be oriented in the same direction. With this structure, the symmetrical DC/DC converter 79 is operable irrespective of the body diode 83.

Figure 9:
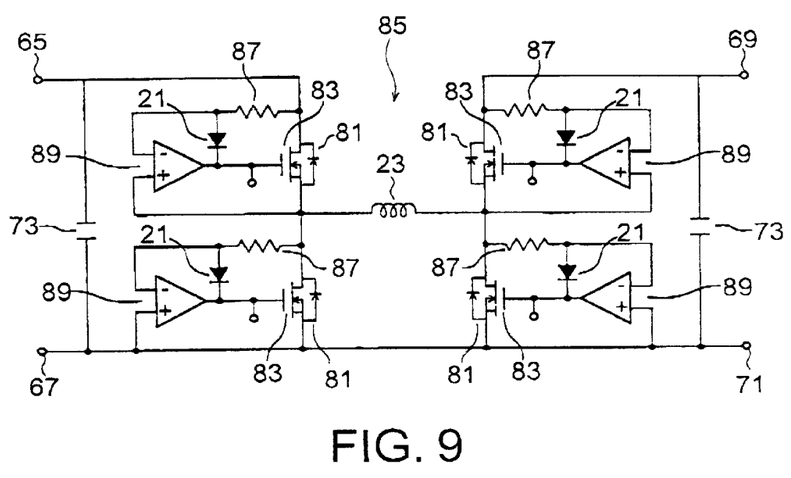
FIG. 9 is a circuit diagram of a symmetrical DC/DC converter according to a fifth embodiment of this invention.

Referring to FIG. 9, a symmetrical DC/DC converter 85 according to a fifth embodiment of this invention has a structure in which the diode operation in the DC/DC converter in FIG. 8 is realized by synchronous rectification so as to improve the efficiency.

Specifically, in the fifth embodiment, a diode 21 is connected to one end of each FET 81 through a resistor 87 so as to perform analog control in a manner such that the output of an operational amplifier 89 is not saturated on a minus side.

As described above, according to the first through the fifth embodiments of this invention, it is possible to provide a symmetrical DC/DC converter operable in a desired energy transfer direction and at a desired step-up or a desired step-down ratio.

Figure 10:
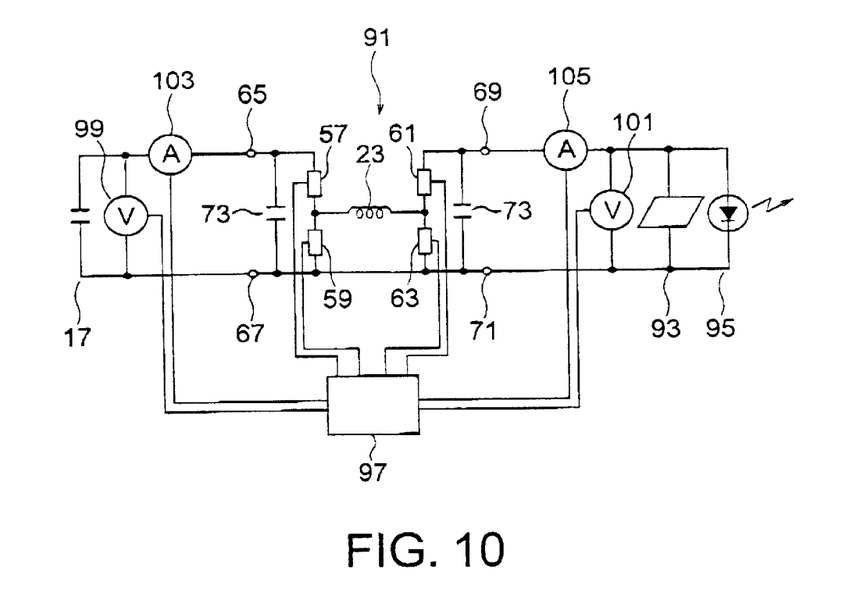
FIG. 10 is a circuit diagram of a symmetrical DC/DC converter according to a sixth embodiment of this invention.

Referring to FIG. 10, a symmetrical DC/DC converter 91 according to a sixth embodiment of this invention is used in a similar energy transfer system to that mentioned in conjunction with the second embodiment. The converter 91 is connected to the electric double layer capacitor 17, a solar cell 93, and a light emitting device 95 as an energy storage device, a power generator, and a load among which the electric energy is transferred. A control unit 97 is supplied from voltage monitors 99 and 101 with voltage information of each terminal and from current sensors 103 and 105 with current information of each terminal. The control unit 97 has a function of judging the state of energy with reference to the voltage information and the current information. The control unit 97 is connected to the first through the fourth switching portions 57, 59, 61, and 63 so that each of the switching portion is controllably put into one of a switching state (SW state) of switching the opened state and the closed state at a high speed, the closed state (ON state), the opened state (OFF state), and the rectifying state (D state) of the rectifying operation or flowing an electric current only in one direction.

Figure 11:
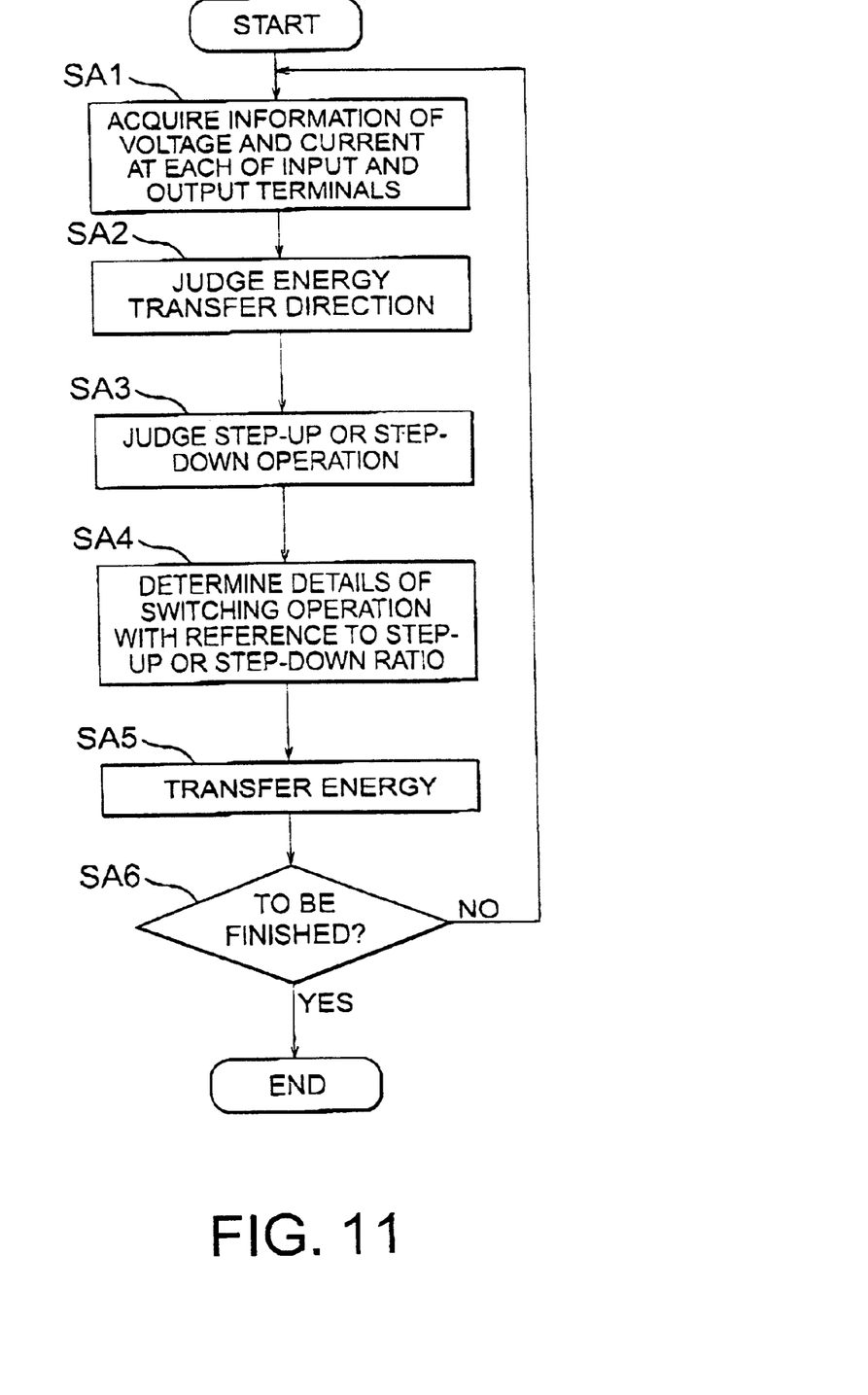
FIG. 11 is a flow chart for describing an operation of the symmetrical DC/DC converter illustrated in FIG. 10.

Referring to FIG. 11, in the symmetrical DC/DC converter 91 according to the sixth embodiment of this invention, the state of each of the first through the fourth switching portions 57, 59, 61, and 63 is controlled by the control unit 97. The control unit 97 acquires and judges the voltage information from the voltage monitors 99 and 101 (steps SA1 and SA2) and the current information from the current sensors 103 and 105 and determines which terminals are to be used as input and output terminals (i.e., the energy transfer direction) and whether the DC/DC converter is to be operated as a step-up converter and a step-down converter (step SA3).

Once the energy transfer direction and one of the step-up and the step-down operations are determined, the switching portions 57, 59, 61, and 63 are controllably put into the states shown in Table 3 to perform the corresponding operations. In addition, for each of the switching portions in the SW state, time intervals between opening and closing operations are controllably set to appropriate lengths in correspondence to the input/output voltage ratio (step SA4). After energy transfer is performed (step SA5), the control unit 97 again judges the voltage information from the voltage monitors 99 and 101 and the current information from the current sensors 103 and 105 and determines how to operate the switching portions next (step SA6). Generally, the above-mentioned operation is repeated unless an end instruction is supplied.

TABLE 3

| 1st, 2nd Terminals | 3rd, 4th Terminals | | 77a | 77b | 77c | 77d |
|---|---|---|---|---|---|---|
| Input | Output | Step-up | ON | OFF | OFF | SW |
| | | Step-down | SW | OFF | ON | OFF |
| Output | Input | Step-up | OFF | SW | ON | OFF |
| | | Step-down | ON | OFF | SW | OFF |

The sixth embodiment has a structure such that not only the electric energy generated by the solar cell 93 is consumed by the light emitting device 95 but also excess electric energy is charged to the electric double layer capacitor 17. When the solar cell 93 generates an electric energy sufficient to make the light emitting device 95 fully emit light, the control unit 97 judges that the operation of charging the electric double layer capacitor 17 is to be carried out. At this time, irrespective of the state of energy, i.e., the voltage of the electric double layer capacitor 17, the control unit 97 judges the input and the output voltages of the converter 91 and determines the step-up or the step-down operation to charge the electric double layer capacitor 17. Furthermore, it is assumed that the light emitting device 95 is desired to emit light even when the solar cell 93 does not generate the electric energy. In this event, if the voltage of the electric double layer capacitor 17 is higher or lower than a particular voltage required to light emission of the light emitting device 95, the voltage is adjusted to an appropriate level and is then supplied to the light emitting device 95. Thus, the light emitting device 95 emits light at a desired luminance.

Figure 12:
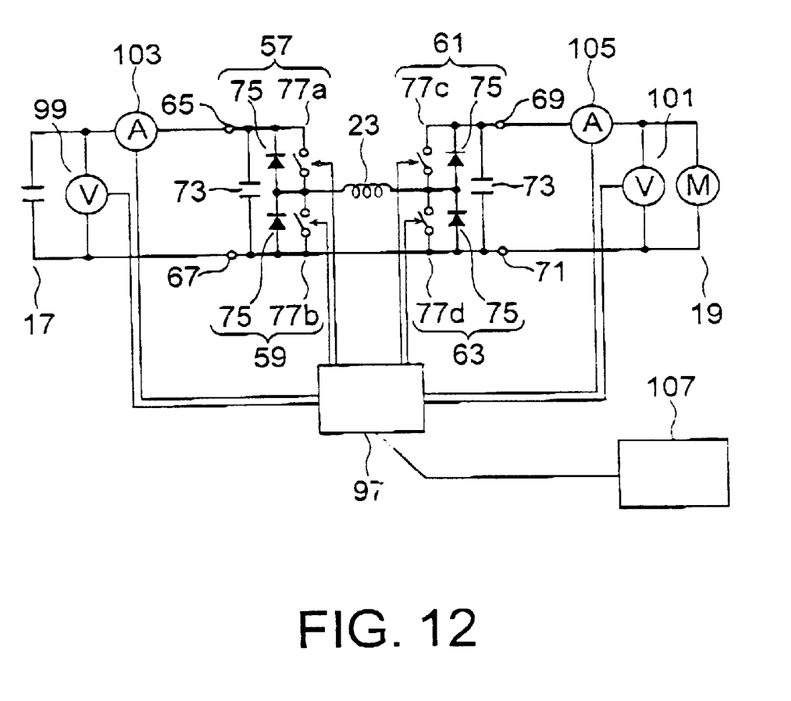
FIG. 12 is a circuit diagram of a symmetrical DC/DC converter according to a seventh embodiment of this invention.

Referring to FIG. 12, a symmetrical DC/DC converter according to a seventh embodiment of this invention is used in an energy transfer system similar to that described in conjunction with the third embodiment. The DC/DC converter is connected to the electrical double layer capacitor 17 and the motor 19 as an energy storage device, a power generator, and a load among which the electric energy is transferred. The control unit 97 is supplied from the voltage monitors 99 and 101 with voltage information of each terminal and from the current sensors 103 and 105 with current information of each terminal.

The control unit 97 is also supplied from a torque setting unit 107 with torque information representative of a desired torque of the motor 19 as desired by a user. The control unit 97 has a function of judging the status of energy from these information supplied thereto. The control unit 97 is connected to the switching circuits 77 so that each switching circuit can be controllably put into one of the switching state (SW state) of switching the opened state (OFF state) and the closed state (ON state) at a high speed, the closed state, and the opened state.

Figure 13:
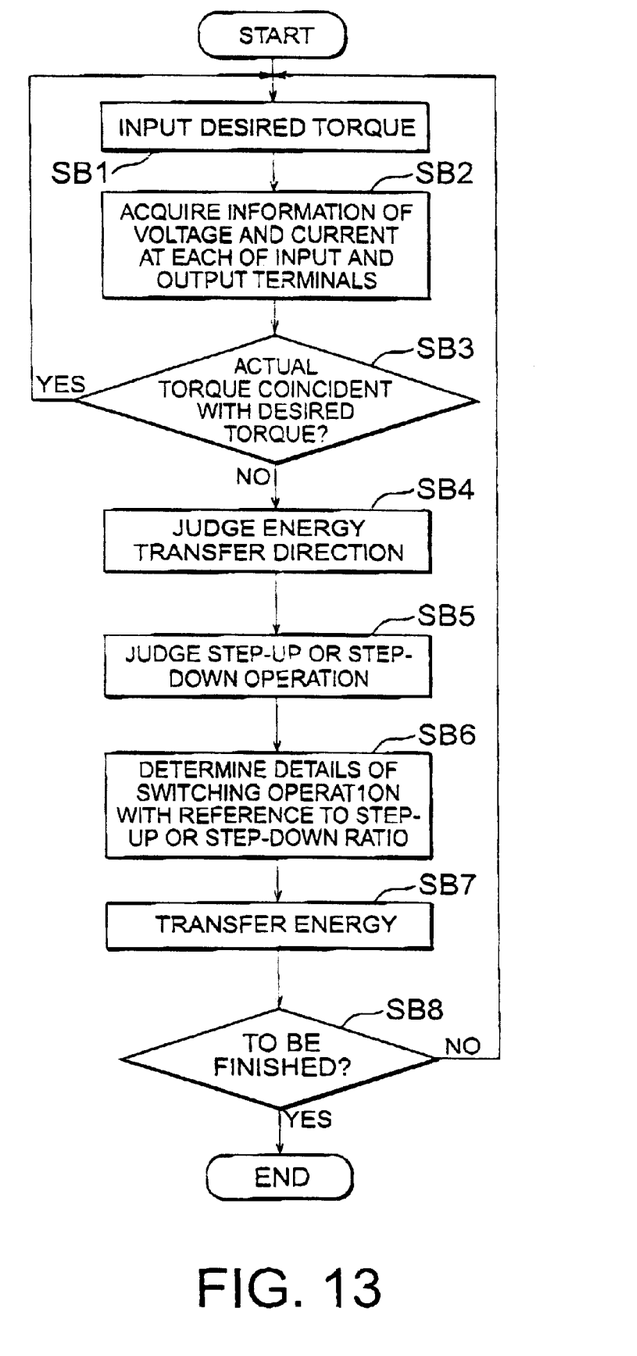
FIG. 13 is a flow chart for describing an operation of the symmetrical DC/DC converter illustrated in FIG. 12.

Referring to FIG. 13, in the symmetrical DC/DC converter according to the seventh embodiment of this invention, the state of the switching circuit 77 is controlled by the control unit 97. The control unit 97 is supplied with external input information, i.e., the torque information from the torque setting unit 107 in the illustrated example (step SB1). The control unit 97 is also supplied from the voltage monitors 99 and 101 with the voltage information and from the current sensors 103 and 105 with the current information (step SB2). The control unit 97 judges these information supplied thereto (step SB3) and determines which terminals are to be used as the input and the output terminals (i.e., the energy transfer direction) (step SB4) and whether the DC/DC converter is to be operated as the step-up converter or the step-down converter (step SB5).

Once the energy transfer direction and one of the step-up and the step-down operations are determined, the switching circuits 77 are controllably put into the states shown in Table 4 so that the switching portions 57, 59, 61, and 63 perform the corresponding operations. For each of the switching portions in the SW state, time intervals between the opening and the closing operations of the switching circuit is controllably set to appropriate lengths in correspondence to the input/output voltage ratio (step SB6). After energy transfer is performed (step SB7), the control unit 97 again judges the voltage information from the voltage monitors 99 and 101 and the current information from the current sensors 103 and 105 and determines how to operate the switching circuits 77 next (step SB8).

TABLE 4

| 1st, 2nd Terminals | 3rd, 4th Terminals | | 57 | 59 | 61 | 63 |
|---|---|---|---|---|---|---|
| Input | Output | Step-up | ON | D | D | SW |
| | | Step-down | SW | D | ON | D |
| Output | Input | Step-up | D | SW | ON | D |
| | | Step-down | ON | D | SW | D |

In the seventh embodiment of this invention, the desired torque of the motor 19 is used as the external information or signal. If the desired torque is smaller than an actual torque of the motor 19 in operation, for example, if the stop of rotation is desired while the motor 19 is rotated, the motor 19 acts as the power generator. At this time, irrespective of the state of energy, i.e., the voltage level of the electric double layer capacitor 17, and irrespective of the voltage level produced by the motor 19, the control unit 97 judges the input and the output voltages and determines the step-up or the step-down operation to charge the electric double layer capacitor 17. If the desired torque is greater than the actual torque of the motor 19 in operation, for example, if the rotation at a certain speed is desired while the motor 19 is stopped, the motor 19 serves as the load. In this event, if the voltage of the electric double layer capacitor 17 is higher or lower than a particular voltage required to operate the motor 19, the voltage is adjusted to an appropriate level to drive the motor 19.

What is claimed is:

1. A symmetrical DC/DC converter having a first pair of terminals and a second pair of terminals and operating symmetrically in that the first pair of terminals and the second pair of terminals are used as a pair of input terminals and a pair of output terminals, respectively, and in the case that the first pair of terminals and the second pair of terminals are used as the pair of output terminals and the pair of input terminals, respectively;

said converter comprising:
  a single inductor having first and second terminals;
  a first switching means connected to said first terminal of said single inductor and comprising first and second switching portions connected in series, said first terminal of said inductor being connected to a junction between a first terminal of said first switching portion and a first terminal of said second switching portion, second terminals of said first and second switching portions selectively acting as input or output terminals of said symmetrical DC/DC converter;
  a second switching means connected to said second terminal of said single inductor and comprising third and fourth switching portions connected in series, said second terminal of said inductor being connected to a junction between a first terminal of said third switching portion and a first terminal of said fourth switching portion, second terminals of said third and fourth switching portions selectively acting as input or output terminals of said symmetrical DC/DC converter;

said converter being selectively operable as a step-up converter and a step-down converter, and wherein when said converter operates as a step-up converter, one of said switching means has its pair of terminals connected to an input source and operates as an input switch, in which said one of the switching portions operates to be in a closed state, and the other of the switching portions operates to be in a first state selected from an opened state and a rectifying state, and the other of said switching means operates as an output switch, in which one of the switching portions operates to be in a second state selected from an opened state and a rectifying state and the other of the switching portions operates to repeat an on-off control action intermittently, and wherein when said converter operates as a step-down converter, said one of said switching means operates as an output switch, in which said one of the switching portions operates to repeat an on-off control action intermittently, and said other of the switching portions operates to be the second state, and said other of said switching means operates an input switch, in which said one of the switching portions operate to be in a closed state, and said other of the switching portions operate to be in the first state.

2. A symmetrical DC/DC converter as claimed in claim 1, wherein one of said input terminals and one of said output terminals are connected to each other.

3. A symmetrical DC/DC converter as claimed in claim 1, further comprising:

a first capacitor connected to said second terminal of said first switching portion and said second terminal of said second switching portion and thus in parallel to said first and second switching portions; and a second capacitor connected to said second terminal of said third switching portion and said second terminal of said fourth switching portion and thus in parallel to said third and fourth switching portions.

4. A symmetrical DC/DC converter as claimed in claim 1, wherein each of said switching portions comprises a field effect transistor and a first diode connected in parallel with said field effect transistor, each of said field effect transistors including a body diode connected in parallel with said first diode.

5. A symmetrical DC/DC converter as claimed in claim 1, wherein said inductor is the only inductor in said symmetrical DC/DC converter.

6. A symmetrical DC/DC converter as claimed in claim 1, wherein said field effect transistor constitutes a fast switching mechanism for switching an opened state and a closed state of the respective one of said switching portions at a high speed at a selected interval and a mechanism for maintaining the closed state, said first diode constituting a rectifying mechanism for flowing an electric current only in one direction.

7. (New) A symmetrical DC/DC converter as claimed in claim 1, further comprising a control unit for monitoring an electric voltage or an electric current for both of two input terminals and two output terminals, determining the state of each of said input and output terminals, automatically determining an energy transfer direction through analysis of information representative of the state of each of said input and output terminals and external information, and controllably putting each of said switching portions into a desired state selected from a switching state of switching an opened state and a closed state at appropriate time intervals, a closure maintaining state, and a rectifying state of flowing an electric current only in one direction.

8. A symmetrical DC/DC converter as claimed in claim 1, wherein one of said input terminals and one of said output terminals are connected to each other with input/output common points formed therebetween, an input voltage being stepped down to a desired voltage as an output voltage, by:

controllably putting said first switching portion between said input terminal and said inductor into a switching state of switching an opened state and a closed state at appropriate time intervals;

controllably putting said second switching portion between said input/output common point and said junction of said first switching portion and said inductor into a rectifying state of flowing the electric current in a direction from said input/output common point to said inductor;

controllably putting said third switching portion between said output terminal and said inductor into the closed state;

controllably putting said fourth switching portion between said input/output common point and said junction between said third switching portion and said inductor into the opened state; and controlling the time intervals between opening and closing operations of each of said switching portions in the switching state.

9. A symmetrical DC/DC converter as claimed in claim 8, further comprising a control unit for monitoring an electric voltage or an electric current for both of two input terminals and two output terminals, automatically determining an energy transfer direction with reference to the state of each of said input and output terminals, and controllably putting each of said switching portions into a desired state selected from a switching state of switching an opened state and a closed state at appropriate intervals at a high speed, a closure maintaining state, and a rectifying state of flowing an electric current only in one direction.

10. A symmetrical DC/DC converter as claimed in claim 1, wherein one of the input terminals and one of the output terminals are connected to each other with input/output common points formed therebetween, an input voltage being stepped up to a desired voltage as an output voltage, by:

controllably putting said first switching portion between said input terminal and said inductor into a closed state;

controllably putting said second switching portion between said input/output common point and said junction of said first switching portion and said inductor into an opened state;

controllably putting said third switching portion between said output terminal and said inductor into a rectifying state of flowing the electric current in a direction from said inductor to said output terminal;

controllably putting said fourth switching portion between said input/output common point and said junction of said inductor and said third switching portion into a switching state of switching the opened state and the closed state at given time intervals at a high speed; and controlling the time intervals between opening and closing operations of each of said switching portions in the switching state.

11. A symmetrical DC/DC converter as claimed in claim 10, further comprising a control unit for monitoring an electric voltage or an electric current for both of two input terminals and two output terminals, automatically determining an energy transfer direction with reference to the state of each of said input and output terminals, and controllably putting each of said switching portions into a desired state selected from a state of switching an opened state and a closed state at appropriate intervals at a high speed, a closure maintaining state, and a rectifying state of flowing an electric current only in one direction.

12. A symmetrical DC/DC converter as claimed in claim 1, further comprising:
   first monitoring means for monitoring voltage and current at said input terminals;
   second monitoring means for monitoring voltage and current at said output terminals; and
   a control unit coupled to said first and second monitoring means for determining an energy transfer direction and controlling said switching portions to enable transfer of energy between said input and output terminals.

13. A symmetrical DC/DC converter comprising:
   a single inductor having first and second terminals;
   a first switching means connected to said first terminal of said single inductor and comprising first and second switching portions connected in series, said first terminal of said inductor being connected to a junction between a first terminal of said first switching portion and a first terminal of said second switching portion, second terminals of said first and second switching portions selectively acting as input or output terminals of said symmetrical DC/DC converter;
   a second switching means connected to said second terminal of said single inductor and comprising third and fourth switching portions connected in series, said second terminal of said inductor being connected to a junction between a first terminal of said third switching portion and a first terminal of said fourth switching portion, second terminals of said third and fourth switching portions selectively acting as input or output terminals of said symmetrical DC/DC converter;
   at least one of said switching portions having a rectifying mechanism which uses a synchronous rectifying technique;
   said first and second switching means being connected in a symmetrical arrangement with respect to said inductor,
   said converter being selectively operable as a step-up converter and a step-down converter, and wherein when said converter operates as a step-up converter, one of said switching means has its pair of terminals connected to an input source and operates as an input switch and the other of said switching means operates as an output switch, and wherein when said converter operates as a step-down converter, said one of said switching means operates as an output switch and said other of said switching means has its pair of terminals connected to an input source and operates an input switch.

14. A symmetrical DC/DC converter as claimed in claim 13, wherein said rectifying mechanism comprises a field effect transistor, a diode connected to a first end of said field effect transistor, a resistor interposed between said diode and a second end of said field effect transistor and an amplifier connected in parallel with said diode and said field effect transistor.

15. A symmetrical DC/DC converter as claimed in claim 13, wherein one of said input terminals and one of said output terminals are connected to each other.

16. A symmetrical DC/DC converter as claimed in claim 13, further comprising:
   a first capacitor connected to said second terminal of said first switching portion and said second terminal of said second switching portion and thus in parallel to said first and second switching portions; and
   a second capacitor connected to said second terminal of said third switching portion and said second terminal of said fourth switching portion and thus in parallel to said third and fourth switching portions.

17. A symmetrical DC/DC converter as claimed in claim 13, wherein each of said switching portions comprises a rectifying mechanism having a rectifying mechanism which uses a synchronous rectifying technique.

18. A symmetrical DC/DC converter as claimed in claim 13, wherein said inductor is the only inductor in said symmetrical DC/DC converter.

19. A symmetrical DC/DC converter as claimed in claim 13, further comprising a control unit for monitoring an electric voltage or an electric current for both of two input terminals and two output terminals, determining the state of each of said input and output terminals, automatically determining an energy transfer direction through analysis of information representative of the state of each of said input and output terminals and external information, and controllably putting each of said switching portions into a desired state selected from a switching state of switching an opened state and a closed state at appropriate time intervals, a closure maintaining state, and a rectifying state of flowing an electric current only in one direction.

20. A symmetrical DC/DC converter as claimed in claim 13, further comprising:
   first monitoring means for monitoring voltage and current at said input terminals;
   second monitoring means for monitoring voltage and current at said output terminals; and
   a control unit coupled to said first and second monitoring means for determining an energy transfer direction and controlling said switching portions to enable transfer of energy between said input and output terminals.

21. A symmetrical DC/DC converter as claimed in claim 1, wherein each of said first and said second states is one of an opened state a rectifying state.

22. A symmetrical DC/DC converter as claimed in claim 1, wherein said first state is an opened state and said second state is a rectifying state.

23. A symmetrical DC/DC converter as claimed in claim 1, wherein at least one of said switching portions comprises a field effect transistor and a first diode connected in parallel with said field effect transistor, said field effect transistor including a body diode connected in parallel with said first diode whereby said symmetrical DC/DC converter is operable irrespective of said body diode, said first and second switching means being connected in a symmetrical arrangement with respect to said inductor.

* * * * *